United States Patent [19]

Forss

[11] 4,306,912
[45] Dec. 22, 1981

[54] PROCESS FOR PRODUCING A BINDER FOR SLURRY, MORTAR, AND CONCRETE

[75] Inventor: Bengt Forss, Pargas, Finland
[73] Assignee: Flowcon Oy, Valkeakoski, Finland
[21] Appl. No.: 154,879
[22] Filed: May 30, 1980

[30] Foreign Application Priority Data

May 31, 1979 [FI] Finland ............................ 791747
Nov. 5, 1979 [FI] Finland ............................ 793452

[51] Int. Cl.³ .......................... C04B 7/14; C04B 7/12
[52] U.S. Cl. ................................ 106/117; 106/118; 106/315
[58] Field of Search .......... 106/117, 315, 118, DIG. 1

[56] References Cited

U.S. PATENT DOCUMENTS

| | | | |
|---|---|---|---|
| 2,646,360 | 7/1953 | Lea | 106/90 |
| 3,689,294 | 9/1972 | Braunauer | 106/90 |
| 3,959,004 | 5/1976 | Stryker | 106/117 |
| 3,960,582 | 6/1976 | Ball et al. | 106/90 |
| 4,019,918 | 4/1977 | Wills, Jr. | 106/315 |
| 4,032,353 | 6/1977 | Ball et al. | 106/315 |
| 4,168,985 | 9/1979 | Kolar et al. | 106/315 |
| 4,169,747 | 10/1979 | De Rooy et al. | 106/315 |

*Primary Examiner*—O. R. Vertiz
*Assistant Examiner*—Mark Bell
*Attorney, Agent, or Firm*—Finnegan, Henderson, Farabow, Garrett & Dunner

[57] ABSTRACT

A process for producing a binder (cement) to be used in slurry, mortar, or concrete having a low water-to-cement ratio. As raw-material for the binder is used at least 50% by weight of a hydraulic material, such as slag, technical pozzolanas and/or natural pozzolanas. The hydraulic material is ground to a specific surface of at least 400 m²/kg. To the raw-material is added 0.1 to 5% by weight of a plasticizing material, such as a sulphonated polyelectrolyte. To the raw-material are also added in total 0.5 to 8% by weight of sodium carbonate and/or sodium hydroxide. Added in small amounts, the sodium carbonate and the sodium hydroxide, separately or in combination, considerably shorten the hardening time of the concrete, yield excellent strengths, and make it possible to use cheap raw-materials.

7 Claims, No Drawings

PROCESS FOR PRODUCING A BINDER FOR SLURRY, MORTAR, AND CONCRETE

This invention relates to a process for producing a binder to be used in slurry, mortar, and concrete having a low water-to-cement ratio, according to which process as raw-material for the binder is used at least 50 % by weight of a hydraulic material, such as slag, technical pozzolanas and/or natural pozzolanas, at least one portion of the hydraulic material is ground to a specific surface of at least 400 m²/kg, and to the raw-material is added 0.1 to 5% by weight of at least one plasticizer, such as a sulphonated polyelectrolyte.

As an additional component of the raw-material of the binder can be used 0 to 50% of materials with a high lime content, such as Portland cement clinker, slaked lime and equivalent.

In the following by "cement" is meant a binder agent in general which, consequently, is not restricted to Ordinary Portland Cement or to its derivatives.

On the other hand, by a "low" water-to-cement ratio is meant a ratio less than 0.4.

Drawbacks of today's Ordinary Portland Cement concrete are, among other things, high cost of the binder, high heat of hydration, poor dimensional stability and poor corrosion resistance of the concrete. The latter drawback partly results from the fact that, as a result of the hydration of the cement, a large quantity of lime $Ca(OH)_2$, already reacting with water and weak acids, is liberated. This quantity may amount to almost one quarter of the entire quantity of binder such that, in acid soil, the concrete must be protected against the corroding effect of the acids in the soil.

The poor corrosion resistance of the concrete partly results from its high porosity which, again, comes from the large quantity of water used for mixing or, in the case of stiff and dry concrete mix, from inadequate compacting. The quantity of water needed for a complete hydration of the cement is about 25% of the weight of the cement, whereas in practical concreting more than double that quantity of water is frequently used. Moreover, in concrete mixes containing an abundance of cement, the high heat of hydration may result in strains and cracking, from which poor corrosion resistance follows.

The resistance to sulphate of the Ordinary Portland Cement concrete is also poor, which results from the high $Al_2O_3$-content of the cement, such that, in sulphate containing environments, a more expensive sulphate-resistant special cement must be used for concrete constructions.

As long as the present cement has been in use, attempts have been made to eliminate or reduce the above drawbacks and troubles by adding to the cement or concrete industrially produced or natural hydraulic materials containing less lime, i.e., pozzolanas, whose cost is considerably lower than the cost of cement and whose resistance to acids and sulphates is higher and heat of hydration lower than those of normal cement. A more extensive use of these additives has been limited mainly by their slow hydration and hardening, which results in poor early strengths and is contrary to the goals of present-day precast industry.

The most important additive of Portland Cement is the blast furnace slag produced in connection with the production of pig iron. In industrialized countries this by-product or waste is produced in so big quantities that it is hard to find use for it. In some countries the use of slag is common but the quantity used is, however, small as compared with the quantity of cement clinker used. The most usual content of slag in slag cement is about 30 to 50%.

The hydraulic properties and the reactivity of the slag depend mainly on the basicity of the slag, i.e., on the ratio of the quantity of its basic components to the quantity of its acid components. When expressing the reactivity of the slag, the co-called F-value is often used as defined in the following equation:

$$F\text{-value} = \frac{CaO + CaS + \frac{1}{2} MgO + Al_2O_3}{SiO_2 + MnO}$$

When the F-value is $>1.9$, the slag is highly reactive, whereas, when the F-value is $<1.5$, the slag is slow-reactive and poor. The hydraulic properties of the slag also depend on the glass content of the slag, which must be higher than 95% in a good slag. The higher the $Al_2O_3$-content, the better are the strength properties of the slag, even though the quantity of $Al_2O_3$-hydration compounds does not directly influence the strength.

The slowness of hydration and hardening resulting from the chemical composition and physical properties of the slag can be eliminated by grinding the slag to a high specific surface, It has been noticed that the strength of slag cement increases rapidly as a function of the specific surface. Owing to its high content of glass, the slag is, however, difficult to grind and the grinding energy required may be the double as compared with cement clinker.

Acceleration of the hydration of slag can also be accomplished by means of various accelerators, the best-known of which are:

cement clinker,
various sulphates, such as anhydrite and gypsum,
slaked or unslaked lime, and
alkalies and alkaline salts.

Among these accelerators, cement clinker as well as gypsum and clinker together are the most commonly used ones.

Owing to their slow reactions, slag cements have found use mainly as so-called low-heat cement in monolithic concrete constructions in view of reducing the risk of cracking.

The fly ash produced in power plants from the combustion of coal, peat, etc. fuels has also been used as an active filler material for low-heat cement and concrete. The fly ash is usually a hydraulic additive reacting more slowly than slag, which results, among other things, from its low content of lime. Its hydraulic properties are usually improved by addition of lime-containing components to same, such as slaked lime and clinker, and by grinding it to a higher fineness. Besides from the fuels used, the composition and hydraulic properties of fly ash also depend on the prevailing combustion conditions. The fineness of the fly ash may be of the order of the fineness of the cement.

It is an object of the present invention to eliminate the above drawbacks and to provide such a process by means of which it is possible, out of by-products and wastes of industry and out of natural pozzolanas, to prepare high-quality, rapidly hardening binders.

The invention is, among other things based on the following ideas:

It has been observed that, besides the use of higher curing temperatures, the use of admixtures of certain kinds has a highly favourable effect on the hydration velocity of slag, wherefore clinker is not needed so abundantly and, in some cases, not at all.

It is well known that blast furnace slag reacts more slowly than clinker but that the ultimate strength of the concrete based on both of the binders is equal.

For example, addition of alkali carbonates or hydroxides also permits abundant use of slag in rapidly reacting cements. For example, when sodium carbonate ($Na_2CO_3$) is used, the effect is likely to be based on an increase in the pH-value, whereby the OH component activates the slag. At the same time, a high pH-value together with a purified lignosulphonate have a fluidizing effect upon the concrete. Besides sodium carbonate, other alkali carbonates (e.g., $K_2CO_3$ and $Li_2CO_3$) and other alkaline salts may also be used.

It has been further observed that the higher the basicity of the slag and the more finely ground the slag is, the higher is its reaction rate.

It is known that it is not worth while grinding cement clinker beyond a certain limit, because additional fineness hardly improves the properties of hardening and strength. On the contrary, it is worth while grinding the slag, e.g., to the specific surface of 400 to 800 $m^2/kg$.

Thus slag starts reacting in the same way as cement when some alkaline salt is added, which functions as an activator.

It is also known that the reaction takes place faster if the curing temperature is raised to, e.g., 40 to 90° C.

It has been further observed that basicity has a favourable effect on the slag if the latter is ground to a sufficient specific surface value (>400 $m^2/kg$).

It is possible to use grinding aids known per se (lignosulphonate or equivalent) which permits fine-grinding of the slag and which may additionally function as plasticizer in the concrete later.

Thus, according to the invention, it is possible to use slag if it is ground sufficiently fine and if alkaline accelerators are used. Under these circumstances, surprisingly, the slag functions as a rapid hardening binder in concrete.

The hydration of slag and pozzolanas can be improved essentially by using plasticizers, such as lignosulphonates or sulphonated lignins or other sulphonated polyelectrolytes, whereby the water-to-cement ratio of concrete can be reduced considerably. By adding various accelerators, such as alkali hydroxides and/or alkali carbonates or other alkaline salts, it is also possible to use binders with high slag contents in rapidly hardending cements. This favourable effect is likely to be based on the higher pH-value, whereby the slag or pozzolana is activated at the same time as the effect of the plasticizers is intensified.

It has been still further observed that alkalinity affects the more favourably, the more slowly reactive the hydraulic binder is by its nature, and that this effect is the stronger, the more finely the binder has been ground. Thus, the slag starts reacting in the same way as cement when some alkali carbonate and/or hydroxide is added which functions as activators.

In view of the above, it is possible to say that the plasticizing agent (e.g., lignosulphonate) and the activator (e.g., NaOH and/or $Na_2CO_3$) together function as a very strong plasticizing combination.

At grinding, it is also possible to add grinding aids known per se and admixtures improving the flow properties of the pulverized binder or the properties of the concrete made out of same (e.g., air-detraining agents, etc.).

More specifically, the process in accordance with the invention is mainly characterized in that into the raw material are also added as setting and hardening regulator in total 0.5 to 8% by weight of at least one alkali hydroxide and/or at least one alkaline salt, such as an alkali carbonate.

According to the invention, the mixtures or part of them may be added in connection with, or after, the grinding.

According to the invention, the binder components can be proportioned such that in the binder the ratio of the total quantity of alkaline earth metals to the quantity of silicon dioxide therein is 1.1 to 1.6, preferably 1.2 to 1.4.

According to the invention, it is also possible to use slag and pozzolanic materials for the preparation of rapidly hardening concrete if, in addition to a fluidizer, strongly alkaline additives (e.g., $Na_2CO_3$, NaOH, etc.) are used.

The fluidizing is an important factor in order to make possible the use of small concentrations of alkaline salts (e.g., $Na_2CO_3$) and alkali hydroxides (e.g., NaOH). Added in small amounts, these materials considerably shorten the setting time. Hereby, the high pH accelerates the hardening and, in combination with a sulphonated polyelectrolyte (e.g., lignosulphonate or sulphonated lignin or other), it also adds to increasing the plasticizing effect. The NaOH, on the other hand, has a decisive influence on shortening the setting and hardening time but it also influences to some extent on the plasticizing.

According to one aspect of the invention, there is added to the mix 0.1 to 3.0% of at least one sulphonated polyelectrolyte or equivalent, and 0.5 to 8.0% (as total amount) of at least one alkali hydroxide, and/or an alkaline salt, such as an alkali carbonate.

The invention will be examined below in the light of a few exemplifying embodiments.

According to the process, slag and/or other pozzolanic substances are ground by means of 0.1 to 5% of alkali-lignosulphonate or sulphonated kraftlignin, possibly together with other sulphonated polyelectrolytes, such as formaldehyde-melamine, formaldehyde-naphthalene, etc. condensation products, to the fineness of 400 to 800 $m^2/kg$.

During the grinding it is possible, at the same time, to add other substances which improve the grinding process, the handling properties of the binder, or the properties of the concrete made of the binder, such as substances improving the flow of the binder powder, accelerators or retarders, air-detraining agents, etc.

It is to be noticed that, within the scope of the invention, the alkali hydroxide and/or alkaline salt need not be added in connection with the grinding, but it may be mixed into the binder separately, or in connection with the mixing into the concrete.

Alkali-lignosulphonates or sulphonated alkalilignins have a favourable effect on the grinding properties of the binder.

As an adjusting agent for the setting and hardening of the binder, it is possible to use alkali bicarbonates, alkali carbonates, hydroxides, and various alkaline salts. These may be added in connection with the grinding, or later.

If it is desirable to add clinker to the binder or to the concrete, the clinker should preferably be ground separately while using the same admixtures.

On the basis of the joint effect of fine grinding as well as of use of grinding aids and of agents used to adjust the hydration velocity it is possible, out of slag and/or other pozzolanas, particularly by means of heat curing, to obtain a rapidly hardening, dense and corrosion-resistant concrete in which the proportion of cement clinker is very small or even none-existent (e.g. 20 to 0%).

EXAMPLE 1

A test was performed on concrete, whose maximum particle size was 12 mm and which contained 400 kg binder/$m^3$ concrete. A curing of 10 cm cubes took place at 70° C. (7 h) until compression. Tributylphosphate was used as air-detraining agent.

As fluidizer was added 0.5% of lignosulphonate and as air-detraining agent 0.1% of tributylphosphate.

According to the U.S. Pat. Nos. 3,960,582, 3,959,004, and 4,032,353, the use of $NaHCO_3$ and of other bicarbonates is recommended besides fluidizer in order to obtain free flowing concrete.

Experiments have, however, shown that in binder mixtures containing an abundance of slag and pozzolanas the use of bicarbonates is not advantageous owing to their low pH (cf. EXAMPLE 1). The use of bicarbonates results in an excessively slow setting and hardening of the concrete where the hydration cannot be accelerated sufficiently even by means of heat curing.

EXAMPLE 3

As binder was used slag/clinker cement 70/30, wherein the specific surface area of both components was 500 $mm^2$/kg. The binder quantity was 400 kg/$m^3$ of concrete.

TABLE 3

| Ligno-sulphonate (%) | Accelerator | Water/cement ratio | Strengths 9 h | 24 h | 7 days |
|---|---|---|---|---|---|
| 1.5 | 1.6% $Na_2CO_3$ | 0.387 | 33 | 38 | 42 |
| 1.5 | 1.3% $NaHCO_3$ | 0.415 | 30 | 35 | 39 |
| 1.5 | 1.5% $KHCO_3$ | 0.387 | 23 | 26 | 34 |
| 1.5 | 2.1% $K_2CO_3$ | 0.385 | 27 | 32 | 34 |

TABLE 1

| Cement clinker | | Slag | | Additives | | Water/cement ratio | Consistency (VB) | Compressive strength (MN/$m^2$) | |
|---|---|---|---|---|---|---|---|---|---|
| Quantity (%) | Fineness $m^2$/kg | Quantity (%) | Fineness ($m^2$/kg) | Lignosulphonate (%) | Accelerator (%) | | | 9 h | 24 h |
| 50 | 552 | 50 | 500 | 2 | 2.0($Na_2CO_3$) | 0.34 | 1 | 31.0 | 35.0 |
| 50 | 552 | 50 | 500 | 1.3 | 1.3($NaHCO_3$) | 0.41 | 2 | 29.5 | 35.1 |
| 50 | 552 | 50 | 500 | 1.1 | 1.6($KHCO_3$) | 0.38 | 3 | 33.3 | 41.0 |
| 50 | 552 | 50 | 600 | 1.8 | 1.8($Na_2CO_3$) | 0.36 | 1 | 40.0 | 45.1 |
| 20 | 552 | 80 | 600 | 1.3 | 1.3($Na_2CO_3$) | 0.35 | 3 | 41.2 | 46.9 |
| 10 | 552 | 90 | 700 | 1.1 | 1.1($Na_2CO_3$) | 0.32 | 1 | 44.9 | 51.0 |
| 0 | | 100 | 700 | 1.4 | 1.8($Na_2CO_3$) | 0.37 | 3 | 30.4 | 37.0 |

EXAMPLE 2

Effect of Accelerator on Hardening of Slag-Based Binder

The specific surface of the slag was 600 $m^2$/kg, the ratio of binder to standard sand 1:3, the water/cement ratio 0.35, the temperature of mortar 50° C. The mortar was cured in a heat cabinet at 50° C. (4 h) and thereafter in 20° C. until compression.

TABLE 2

| Test No. | Accelerator | Compressive strength MN/$m^2$ 1 day | 3 days | 28 days |
|---|---|---|---|---|
| 1 | 0.8% $NaHCO_3$ | 0.4 | 1.2 | 17.0 |
| 2 | 1% $Na_2CO_3$ | 20.6 | 26.5 | 31.1 |
| 3 | 1% $Na_2CO_3$ + 0.1% NaOH | 24.3 | 29.9 | 34.1 |
| 4 | 1% $Na_2CO_3$ + 0.25% NaOH | 28.5 | 32.9 | 36.0 |
| 5 | 1% $Na_2CO_3$ + 1% NaOH | 38.7 | 45.2 | 51.0 |

To the concrete was added 0.1% tributylphosphate (TBP), and the heat curing took place at 70° C.

EXAMPLE 4

When slag alone is used as binder, the effect of alkalinity both on the fluidity and on the development of strength comes out even more clearly, which is seen from the following Table 4.

(As binder was used 400 kg/$m^3$ of a slag having a specific surface area of 470 $m^2$/kg. The air-detraining agent was TBP (0.1%). The concrete was cured at 70° C.)

TABLE 4

| Quantity of Lignosulphonate as Fluidizer (%) | Accelerator | Quantity of Accelerator (%) | Water/cement ratio | Slump (cm) | Strengths (MN/$m^2$) 6 h | 9 h | 3 days | 7 days |
|---|---|---|---|---|---|---|---|---|
| 1.5 | $Na_2CO_3$ | 3.0 | 0.38 | 6 | 18 | 20 | 26 | 28 |
| 1.5 | $NaHCO_3$ | 2.4 | 0.40 | 9 | 0.7 | 6 | 9 | 13 |
| 1.5 | NaOH | 1.0 | 0.365 | 23 | 13 | 14 | 15 | 18 |
| 1.5 | NaOH | 2.0 | 0.325 | 20 | 19 | 21 | 29 | 30 |
| 1.5 | NaOH | 3.0 | 0.335 | 19 | 29 | 33 | 34 | 35 |
| 1.5 | NaOH | 6.0 | 0.335 | 18 | 33 | 35 | 38 | 40 |
| 2.0 | NaOH + $Na_2CO_3$ | 3.5 + 1.5 | 0.32 | 20 | 32 | 34 | 37 | 39 |

Depending on the concreting conditions and on the requirements imposed on the concrete mix and on the hardened concrete, it is possible to use different combinations of accelerators in order to reach the goal in an optimum economical way.

It is also well known that a strong and durable concrete is obtained by using, in the mixing of concrete, a minimum of water and a binder which does not contain an unnecessary abundance of lime.

In Portland cement clinker, a high lime saturation degree is employed in order to accelerate the hydration reactions. When the hydration is accelerated by means of heat, low water-to-cement ratio, and various accelerators, a high lime saturation degree is more detrimental than useful. In normal concrete the deliberated lime maintains a high pH-value, which protects the reinforcement from rust. In dense, low-porosity concrete this is unnecessary, and the total quantity of alkaline earth oxides must be adjusted in accordance with the $SiO_2$-content of the binder. When this ratio is about 1.2 to 1.5, strengths corresponding to those obtainable with the best cements are also achieved with hydraulic binders that are considered inferior, such as slag and fly ash, by using heat curing.

EXAMPLE 5

Fly ash alone does not yield satisfactory strengths even if it is activated by means of a base, nor does a slag/fly ash mixture of the ratio of 2:1. If the quantity of fly ash is reduced to 10%, the above molar ratio is acheived, which is also seen in the development of strength in the following Table 5. In order to reach this molar ratio, the slag/fly ash mixture of 2:1 needs an approximately 10% addition of lime, whereby the strengths are improved remarkably. With a bigger addition of lime, the strengths will again decrease.

TABLE 5

| Binder | Ligno-sulphonate (%) | Accelerator (% NaOH) | Water/cement ratio | Slump (cm) | Strengths (MN/m$^2$) | | | |
|---|---|---|---|---|---|---|---|---|
| | | | | | 6 h | 9 h | 3 days | 7 days |
| 100% PFA | 2.0 | 3.0 | 0.305 | 21 | 3 | 4 | 9 | 15 |
| 67% S, 33% PFA | 1.5 | 3.0 | 0.310 | 20 | 0.1 | 0.2 | 2.0 | 5.0 |
| 90% S, 10% PFA | 0.8 | 2.0 | 0.310 | 16 | 26 | 27 | 32 | 37 |
| 60% S, 30% PFA, 10% SL | 1.5 | 3.0 | 0.315 | 17 | 33 | 52 | 57 | 60 |
| 53% S, 27% PFA, 20% SL | 1.5 | 3.0 | 0.345 | 9 | 26 | 34 | 37 | 40 |
| 47% S, 23% PFA, 30% SL | 1.5 | 3.0 | 0.360 | 17 | 20 | 26 | 32 | 35 |

In this table, PFA=fly ash, S=slag, SL=slaked lime. The quantity of binder was 400 kg/m$^3$. As air-detraining agent was added 0.1% of tributylphosphate, and as retarder 0.05% of Na-gluconate. The curing temperature was 70° C.

In the following Example 6, the results of a full scale test are presented:

EXAMPLE 6

Consistency:

The water-to-cement ratio of the concrete obtained by means of the process according to the present invention lies normally about 25 to 40% below the corresponding ratio of OPC (Ordinary Portland Cement). Even so, the workability of the new concrete is better than the workability of normal OPC concrete.

By using a slag amount of 400 kg/m$^3$ concrete, the consistency of the concrete measured as slump in cm changed as a function of the water-to-cement ratio in a full scale test performed in a precast concrete factory as appears in the following Table 6.

TABLE 6

| Water/cement | 0.38 | 0.05 | 0.33 | 0.30 | 0.38 | 0.273 |
|---|---|---|---|---|---|---|

TABLE 6-continued

| ratio | | | | | | |
|---|---|---|---|---|---|---|
| Slump (cm) | 25 | 23.5 | 21 | 18 | 12 | 2 |

When the concrete mixer was not adequately cleaned from OPC concrete, the following results (Table 7) were obtained, showing that OPC shall not be mixed with the new concrete.

TABLE 7

| Water/cement ratio | 0.35 | 0.34 | 0.325 |
|---|---|---|---|
| Slump (cm) | 22 | 22 | 12 |

"Shock curing" of the new concrete:

In a factory a floor element was cast using a 20% concrete comprising 340 kg of slag/m$^3$ and having a water-to-cement ratio of 0.41.

After a pre-storing of 30 minutes, the element was introduced into an infra-red furnace. The evloution of the strength was observed by compressing 15 cm cubes which had been stored in a corresponding manner. The following results were obtained (Table 8):

TABLE 8

| curing time (h) | 0.5 | 1.5 | 2.5 | 3.0 | 3.5 | 4.0 | 4.5 | 5.0 |
|---|---|---|---|---|---|---|---|---|
| Average air temperature (°C.) | 31 | 58 | 66.6 | 66 | 67 | 67.5 | 68.5 | 68.5 |
| Maturity (h°C.) | 15.5 | 60.5 | 125.0 | 158.5 | 191.8 | 225.8 | 259.8 | 293.8 |
| Compressive strength (MN/m$^2$) | | | 21.5 | 24.5 | 26.0 | 30.0 | 34.6 | 36.5 |

As appears, the strength increase was very rapid and no cracking could be observed in the element.

It should be observed that it is not critical to the process according to the invention how the $OH^-$ group and the alkali carbonate are introduced into the binder. This can also take place by means of a chemical reaction, e.g., according to the formula:

$$Na_2CO_3 + Ca(OH)_2 \rightarrow CaCO_3 + 2NaOH \quad (1)$$

Correspondingly, the alkali carbonate can be introduced by adding an excessive amount thereof, whereby, e.g., a reaction according to the following formula takes place:

$$4Na_2CO_3 + Ca(OH)_2 \rightarrow CaCO_3 + 2NaOH + 2Na_2CO_3 \quad (2)$$

What I claim is:

1. A process for producing a binder which comprises combining;

as a first material in an amount of from 50 to 99.4% by weight of at least one selected from the group consisting of slag, fly ash, technical pozzolanas, and natural pozzolanas;

grinding said first material to a specific surface of at least 400 m$^2$/kg;

adding from 0 to 50% by weight of a second material having a high lime content and selected from the group consisting of Portland cement clinker and slaked lime;

adding a plasticizer from 0.1 to 5% by weight of at least one sulphonated polyelectrolyte selected from the group consisting of lignosulphonates, sulphonated lignins, melamine-formaldehyde condensates, and naphthalene-formaldehyde condensates, and adding a setting and hardening regulator of 0.5% to 8% by weight of at least one material selected from the group consisting of NaOH, NaCO$_3$, K$_2$CO$_3$, and Li$_2$CO$_3$.

2. A process as claimed in claim 1, wherein the regulator is a combination of Na$_2$CO$_3$ and NaOH.

3. A process as claimed in claim 2, wherein the amount of added Na$_2$CO$_3$ is 0.5 to 3% by weight and the amount of added NaOH is 0.5 to 3% by weight.

4. A process as claimed in claim 2, wherein NaOH is added as setting and hardening regulator in an amount of 1 to 4% by weight.

5. A process as claimed in claim 1, wherein the admixtures are added in connection with the grinding of the first material.

6. A process as claimed in claim 1, wherein the admixtures are added after grinding of the first material.

7. A process as claimed in claim 1, wherein NaOH is added by means of a chemical reaction between Na$_2$CO$_3$ and Ca(OH)$_2$.

* * * * *

UNITED STATES PATENT AND TRADEMARK OFFICE
CERTIFICATE OF CORRECTION

PATENT NO. : 4,306,912
DATED : December 22, 1981
INVENTOR(S) : Bengt Forss

It is certified that error appears in the above-identified patent and that said Letters Patent are hereby corrected as shown below:

Column 10, line 8, change "2" to --1--.

Signed and Sealed this

Thirty-first Day of August 1982

[SEAL]

Attest:

Attesting Officer

GERALD J. MOSSINGHOFF
Commissioner of Patents and Trademarks